US009296438B2

(12) United States Patent
Riondato

(10) Patent No.: US 9,296,438 B2
(45) Date of Patent: Mar. 29, 2016

(54) BICYCLE SADDLE

(75) Inventor: Francesco Riondato, Bassano del Grappa (VI) (IT)

(73) Assignee: SELLE SMP S.A.S. DI MAURIZIO SCHIAVON, Casalserugo (PD) (IT)

( * ) Notice: Subject to any disclaimer, the term of this patent is extended or adjusted under 35 U.S.C. 154(b) by 197 days.

(21) Appl. No.: 13/984,181

(22) PCT Filed: Feb. 7, 2012

(86) PCT No.: PCT/EP2012/000552
§ 371 (c)(1),
(2), (4) Date: Aug. 7, 2013

(87) PCT Pub. No.: WO2012/107215
PCT Pub. Date: Aug. 16, 2012

(65) Prior Publication Data
US 2013/0313870 A1    Nov. 28, 2013

(30) Foreign Application Priority Data
Feb. 11, 2011 (IT) .............................. VI2011A0024

(51) Int. Cl.
*B62J 1/00* (2006.01)
*B62J 1/08* (2006.01)
*B62J 1/18* (2006.01)

(52) U.S. Cl.
CPC .................. *B62J 1/002* (2013.01); *B62J 1/007* (2013.01); *B62J 1/08* (2013.01); *B62J 1/18* (2013.01)

(58) Field of Classification Search
CPC .............. B62J 1/002; B62J 1/007; B62J 1/08; B62J 1/18
USPC ......................................................... 297/202
See application file for complete search history.

(56) References Cited

U.S. PATENT DOCUMENTS 594,451 A * 11/1897 Wheeler ....................... 297/202
6,257,662 B1 * 7/2001 Yates .......................... 297/214
(Continued)

FOREIGN PATENT DOCUMENTS

EP       1 837 270       9/2007
WO      WO 99/14103     3/1999
(Continued)

OTHER PUBLICATIONS

International Search Report of PCT/EP2012/000552, date of mailing Apr. 24, 2012.
(Continued)

*Primary Examiner* — David R Dunn
*Assistant Examiner* — Tania Abraham
(74) *Attorney, Agent, or Firm* — Collard & Roe, P.C.

(57) ABSTRACT

There is provided a bicycle saddle (1) with two identical portions (2, 3) arranged symmetrically with respect to the longitudinal axis of the saddle, the portions being mutually separated, at the upper part by a substantially dove-tail-shaped inlet (4) and mutually connected by a depression (11), after which a channel-shaped-hole (5) open from top to bottom is provided. The inlet (4), the depression (11), and the channel (5) are arranged at the median longitudinal axis of the saddle. Due to the configuration, the user using the saddle during cycling does not feel the pressure of the structures on the floor of the perineum, does not feel the temporary prostatic congestion and it does not bruise the coxal bone.

4 Claims, 12 Drawing Sheets

(56) References Cited

U.S. PATENT DOCUMENTS

| | | |
|---|---|---|
| 6,450,572 B1 | 9/2002 | Kuipers |
| 6,523,891 B1 * | 2/2003 | Yates .......................... 297/202 |
| 7,475,940 B2 | 1/2009 | Riondato |
| 7,537,281 B2 | 5/2009 | Riondato |
| 7,699,391 B2 | 4/2010 | Riondato |
| 2003/0071498 A1 | 4/2003 | Yu |
| 2007/0210624 A1 | 9/2007 | Chen et al. |
| 2008/0134533 A1 | 6/2008 | Bird et al. |

FOREIGN PATENT DOCUMENTS

| | | |
|---|---|---|
| WO | WO 2004/069636 | 8/2004 |
| WO | WO 2006/013063 | 2/2006 |
| WO | WO 2006/015731 | 2/2006 |
| WO | WO 2007/147524 | 12/2007 |

OTHER PUBLICATIONS

Written Opinion of the International Searching Authority of PCT/EP2012/000552, Feb. 7, 2012.

* cited by examiner

BICYCLE SADDLE

CROSS REFERENCE TO RELATED APPLICATIONS

This application is the National Stage of PCT/EP2012/000552 filed on Feb. 7, 2012, which claims priority under 35 U.S.C. §119 of Italian Application No. VI2011A000024 filed on Feb. 11, 2011, the disclosure of which is incorporated herein by reference. The international application under PCT article 21(2) was published in English.

The present invention regards a bicycle saddle.

The saddle according to the present invention constitutes a development of the saddles described in U.S. Pat. Nos. 7,537,281 and 7,699,391, while U.S. Pat. No. 7,475,940 relates to a fork for supporting the body of the bicycle saddle.

The objects described in the above-mentioned documents were extended as patents even worldwide, passing the merit exams for grant thereof, in particular at European patent level, in the United States and China. The saddles described in such documents were actually made and marketed at a high number; such saddles were widely popular, both among professional and amateur cyclists, given that such saddles are capable of overcoming and eliminating most of the sitting problems observed on similar saddles of the known type.

In particular, such saddles were subjected to a strict medical test, which carried out comparisons with a saddle of the known type (with straight tip and without an open central channel), in particular for establishing the existing difference between the genital-perineum blood perfusion when the cyclist is sitting on the saddle and cycling, and the normal rest conditions. In particular such test revealed that with the above described saddles blood perfusion reached 80% with respect to rest conditions, compared to the poor 20%, observed with the saddles of the known type. Such test was carried out in 2005 by Guglielmo Breda, practitioner in the Urology department of Ospedale San Bassiano of Bassano del Grappa (VI) Italy and it was validated by the article published in the Boston Journal of Sexual Medicine, by the renowned American urologist Dr. Irvin Goldstein (see http://www.blacksynergy.com/toc/jsm/2/).

By way of evidence reference shall be made to the medical tests carried out by Dr. Ulrich Swarzer of the department of Urology of the University of Cologne (Germany, 2002) and by Dr. Goldstein, in October 1996 (156(4):1320-9).

In particular, thousands of cyclists, who used such saddles, entirely confirmed the results of the aforementioned medical tests, i.e. that they did not feel the pressure on the structures on the floor of the perineum; furthermore, after long hours positioned on the saddle, the cyclists no longer felt the temporary prostatic congestion and they observed that the bruise on the coxal bone is almost null, which is normally observed using the other saddles of the known type, over the same period of time.

The object of the present invention is that of providing a saddle, which as the closest state of the art refers to that of the previously described saddles, which allows a better possibility of use and better results in use with respect to such saddles.

The present invention will now be described in detail, with reference to some particular embodiments thereof, provided by way of non-limiting example, with reference to the attached drawings wherein.

Figure 4:
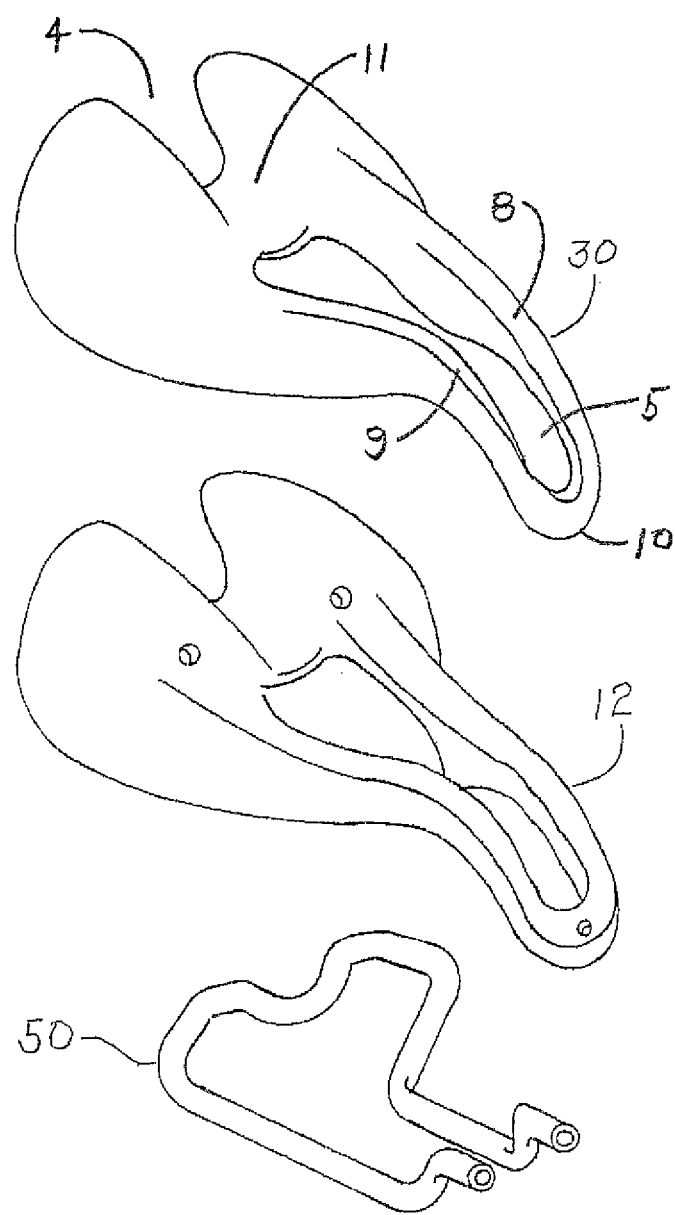
Figure 5:
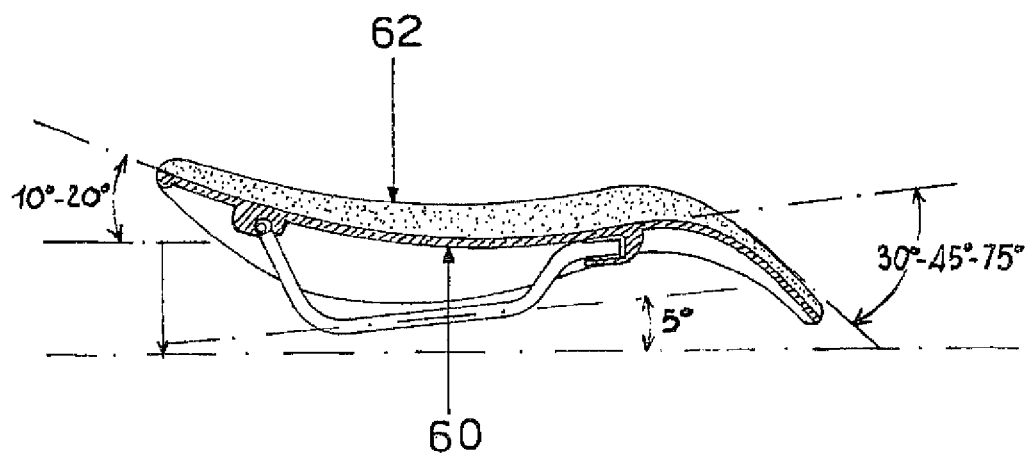
Figure 6:
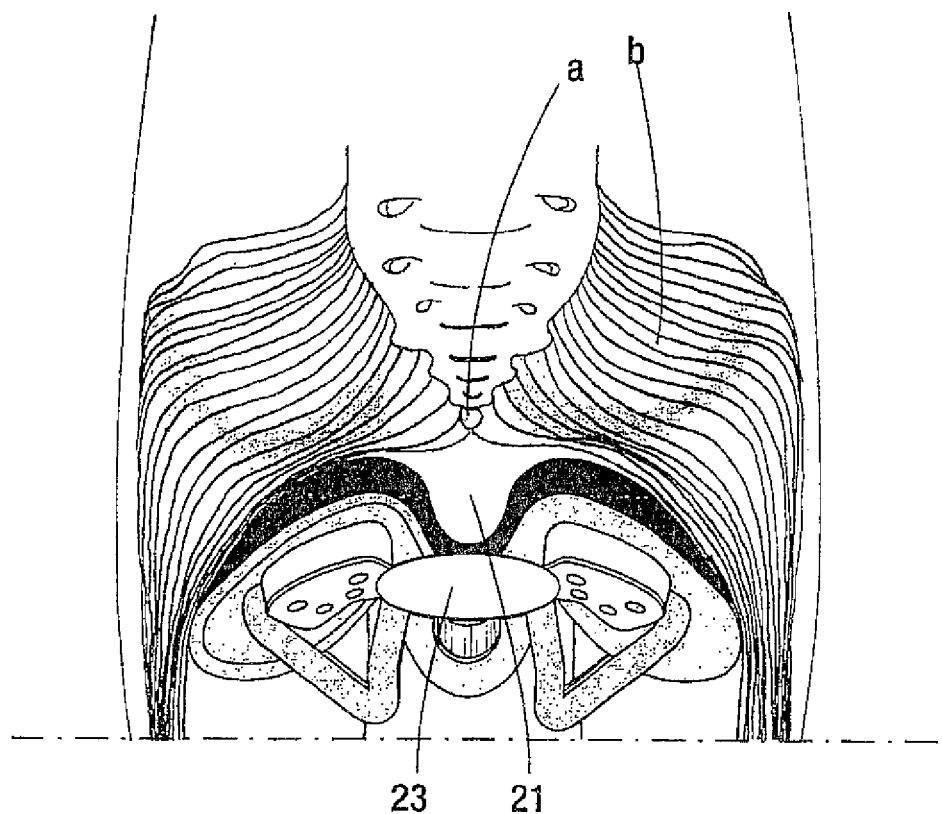
Figure 7:
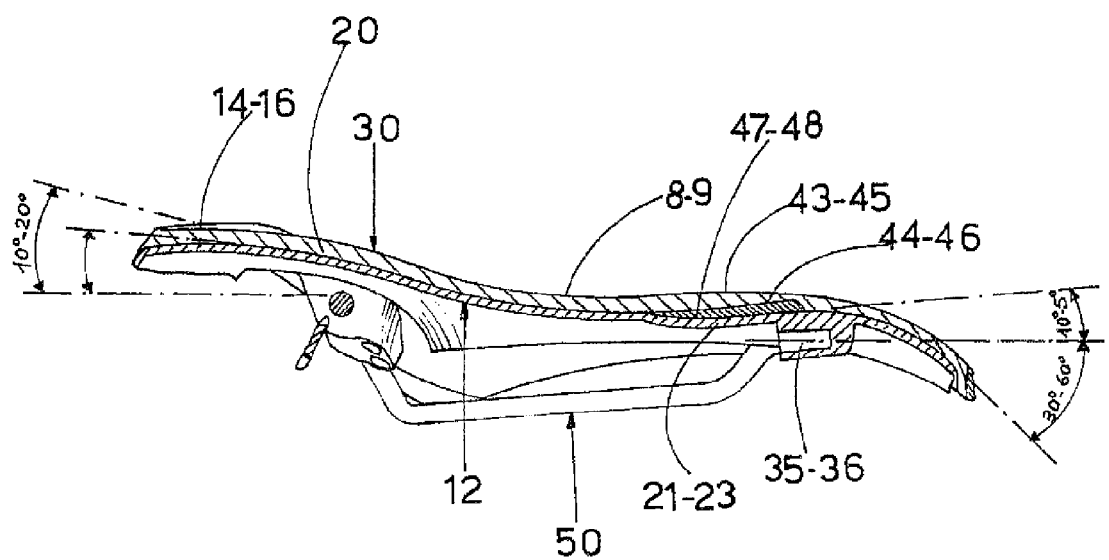
Figure 8:
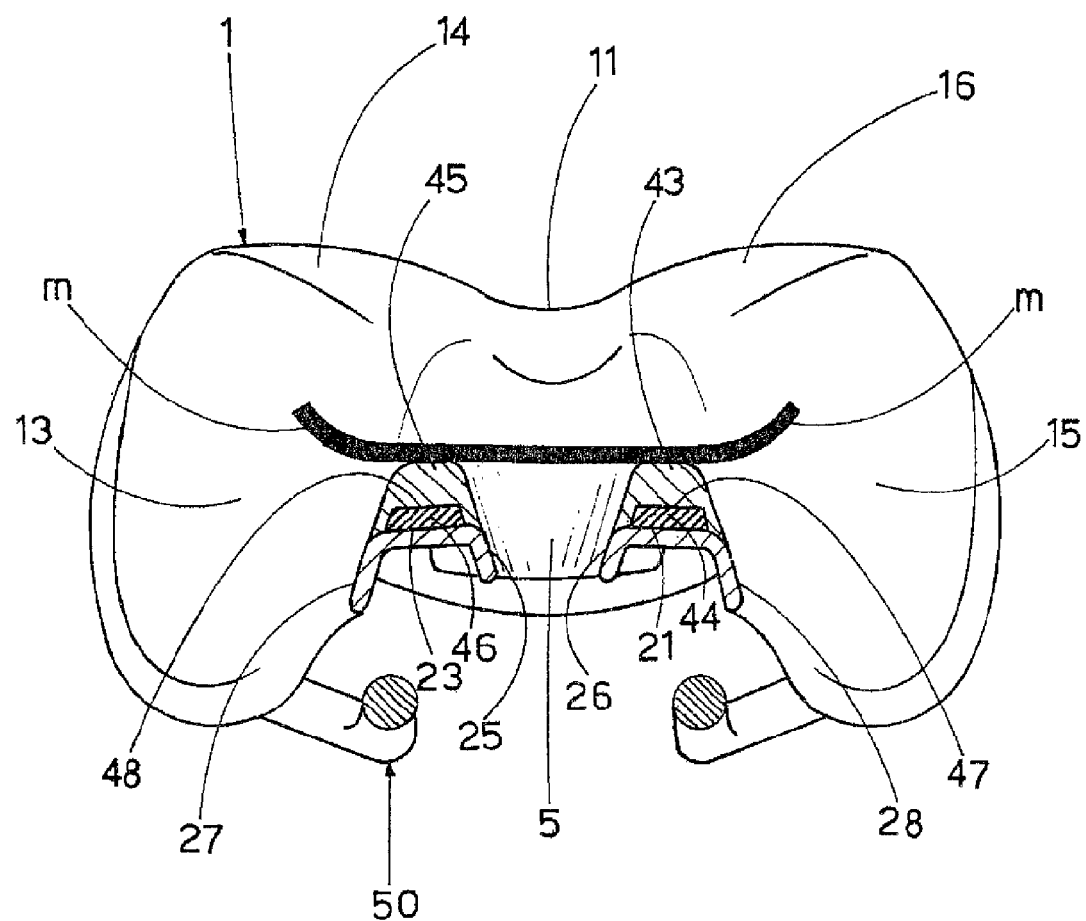
Figure 9:
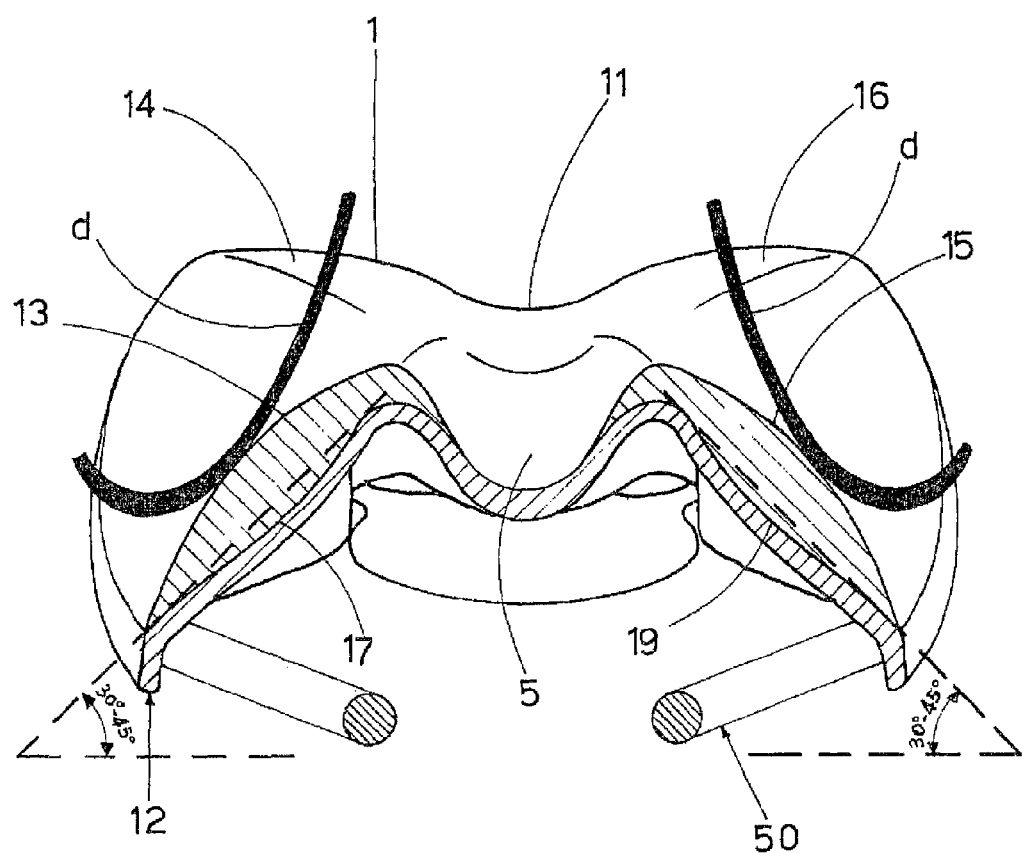
Figure 10:
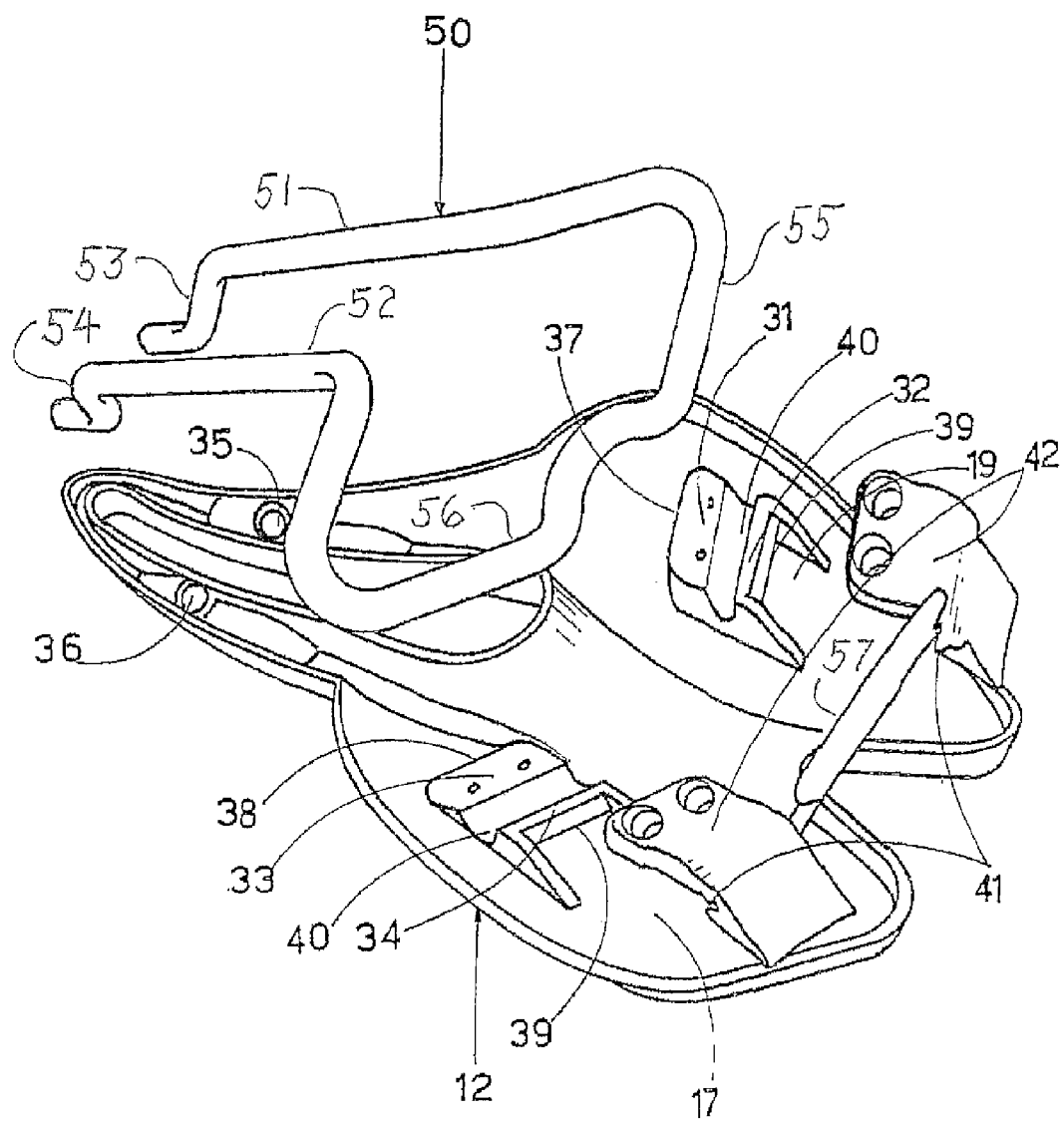
Figure 11:
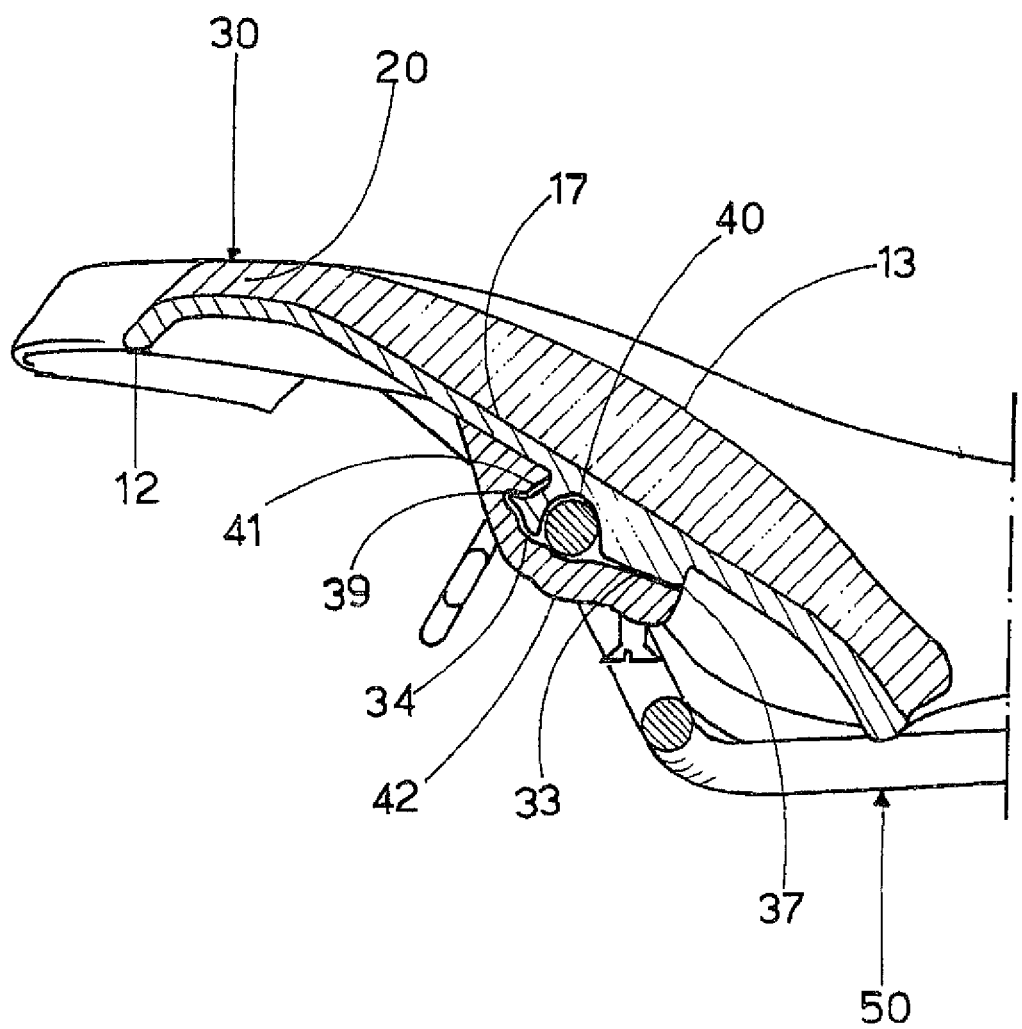
Figure 12:
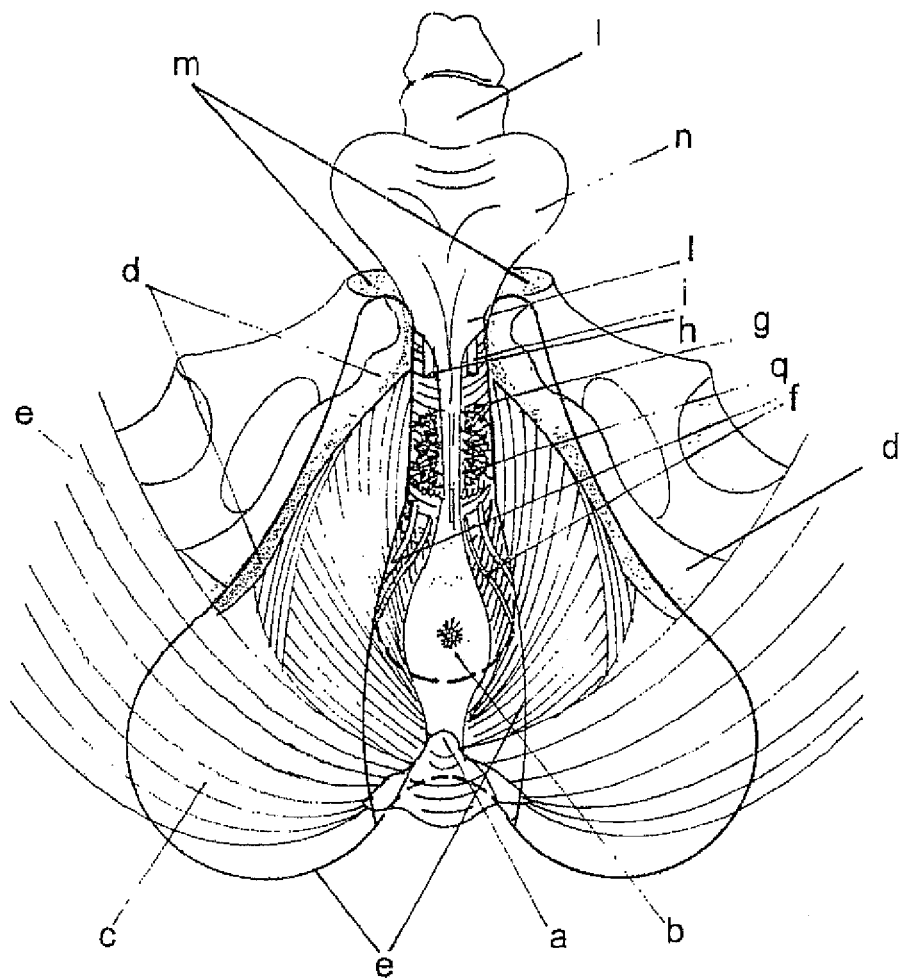

FIGS. 4, 5, and 6 are respectively an exploded perspective view, a longitudinal section and a transverse section (with transverse dissection of the gluteal muscles of the cyclist) of the saddle described in U.S. Pat. No. 7,699,391;

FIG. 7 is a longitudinal cross-sectional view of the saddle according to the invention;

FIG. 8 is a transverse cross-sectional view of the saddle according to the invention, where the support of the pubic part of the cyclist is also schematically indicated;

FIG. 9 is another transverse cross-sectional view of the saddle according to the invention, at the area where the ischial tuberosity of the cyclist is rested;

FIG. 10 is a perspective view of the lower surface of the body of the saddle according to the invention, as well as of the support fork thereof and of the other members that allow fixing the fork to the saddle body;

FIG. 11 is a centerline longitudinal cross-sectional view of the saddle according to the invention, at the area in which there occurs the fixing of the support fork on the body of the saddle;

FIG. 12 is a transverse cross-sectional view of the dissection of the structures of the floor of the perineum, highlighting the perimeter of the saddle and the central channel where the latter lies.

IN PARTICULAR IN THIS FIGURE, JUST LIKE IN THE OTHERS INDICATED PREVIOUSLY, ANATOMIC ORGANS OF THE CYCLIST ARE INDICATED, IDENTIFIED BY THE FOLLOWING REFERENCES:

a—coccyx b—anus
c—gluteal muscles
d—ischial tuberosity
e—perimeter of the saddle according to the finding f—pudendal artery
g—body of the penis
h—deep dorsal artery of the penis i—deep dorsal vein of the penis
l—penis
m—pubic arch n—testicles
q—prostate Before starting the description of the saddle according to the present invention, the characteristics of the saddle described in U.S. Pat. No. 7,699,391 will be highlighted below, followed by the more detailed description of the characteristics of the saddle according to the invention with reference to the closest state of the art.

FIGS. 4 and 5 show that the saddle of known type has two identical portions, arranged symmetrically with respect to the longitudinal axis of the saddle, said portions being separated, at the rear part thereof, by a substantially dove-tail-shaped inlet 4. Thus these portions are mutually connected by a depression 11, after which a channel-shaped hole 5 open from top to bottom is provided.

The inlet 4, the depression 11 and the channel 5 are arranged at the median longitudinal axis of the saddle, the channel gradually narrowing in width, going from the rear part thereof to, the front part thereof. Furthermore, it is provided that the channel is delimited by two portions 8, 9, which are mutually connected and inclined so as to impart an aquiline-shaped configuration to the front end 10 of the saddle. In these figures the same reference numbers are used, with identical elements, which will also be used for the saddle according to the invention, so as to place the common parts between the two saddles in direct relation.

In this saddle of the known type the padding is made of foamed polymer, it has a thickness equivalent to 8-12 mm and it is arranged at the entire surface where the gluteal muscles, the ischial tuberosities and the pubic arch rest. On the body the padding is glued and the entirety is generally covered by top quality hide. Carefully observing FIG. 6, it can be observed that the gluteal muscles, made up of muscular fibers which alone are capable of bearing a rigid sitting, rest on the padding, allowing said muscles, even when travelling on an uneven surface, not to ever touch the rigid surface underlying the body.

However, at the same time, due to the pressure of the padding, should the cyclist find a slight roughness on the ground, said gluteal muscles are lowered towards the ischial tuberosities, which are made up of a bone covered by a membrane, increasing the compression of such tuberosities on the padding on which they lie, until they are made to touch the surface of the underlying body made up of rigid plastic material. Due to this, the cyclist, at each roughness of the road surface, feels an uncomfortable bruising right on the point where the ischial tuberosities rest. The pubic arch, which rests on the front part of the saddle illustrated in FIG. 5, is also made up of bones covered by a membrane, and it is pressed by the weight of the bust of the body of the cyclist when it rests on the handlebar; generally, the padding arranged on the front areas of the saddle is not capable of preventing the latter from touching the underlying body, thus subjecting the cyclist to feel an inevitable bruising.

The first object of the present invention is to provide a saddle capable of overcoming the drawbacks described above, allowing the cyclist to pedal even over long hours both during training and race without being subjected to any bruising.

A further object of the invention is to provide a saddle having a more aggressive and elegant structure with respect to the saddle of the known type mentioned previously, obtaining improvements also as regards the design thereof.

Lastly, a further object of the invention is to improve the system for fixing the support fork to the body of the saddle, according to the fork described in the previously mentioned patent document.

Figure 1:
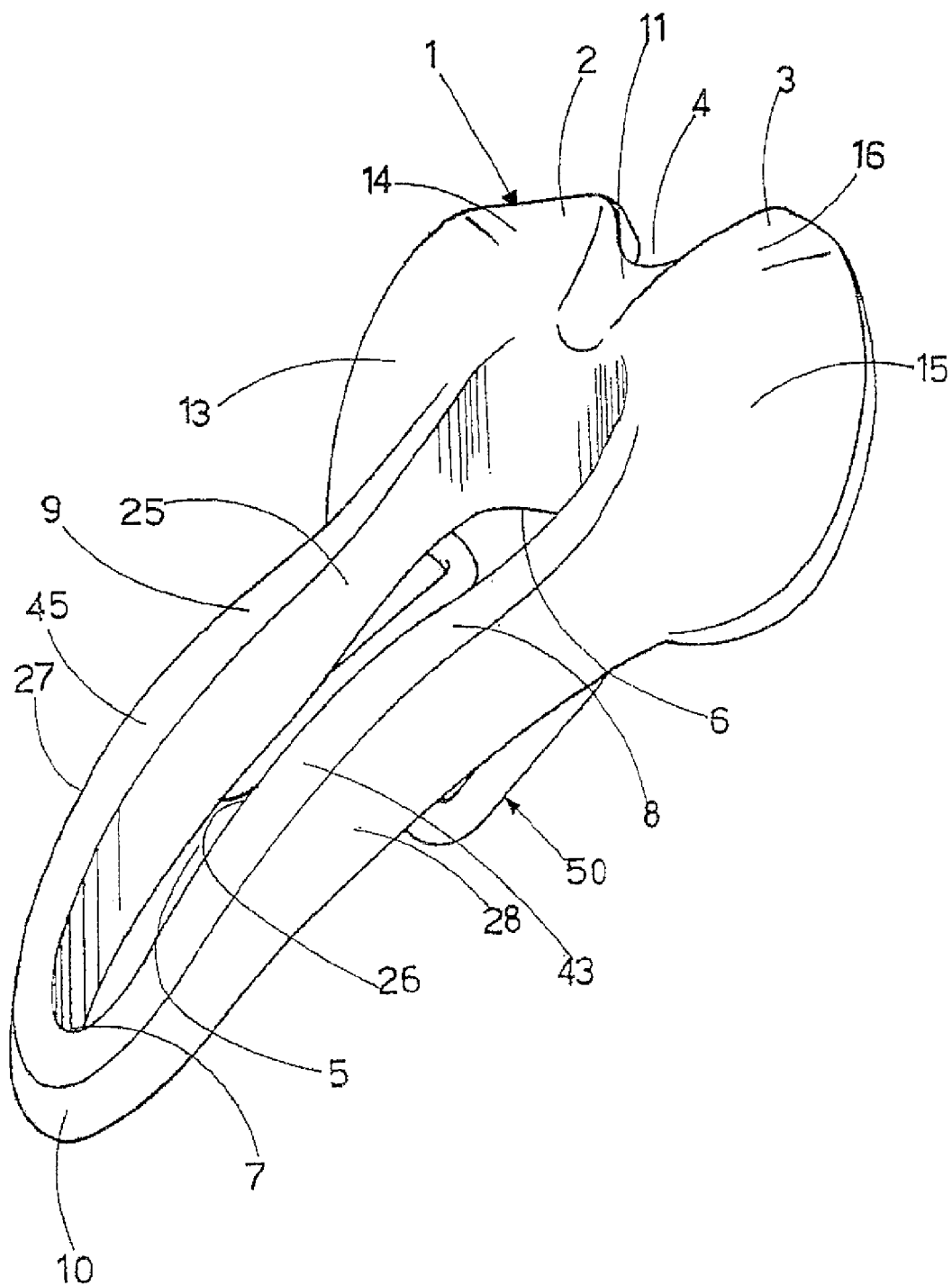
FIG. 1 is a perspective view of the saddle according to the invention, provided with the outer covering thereof.
Figure 2:
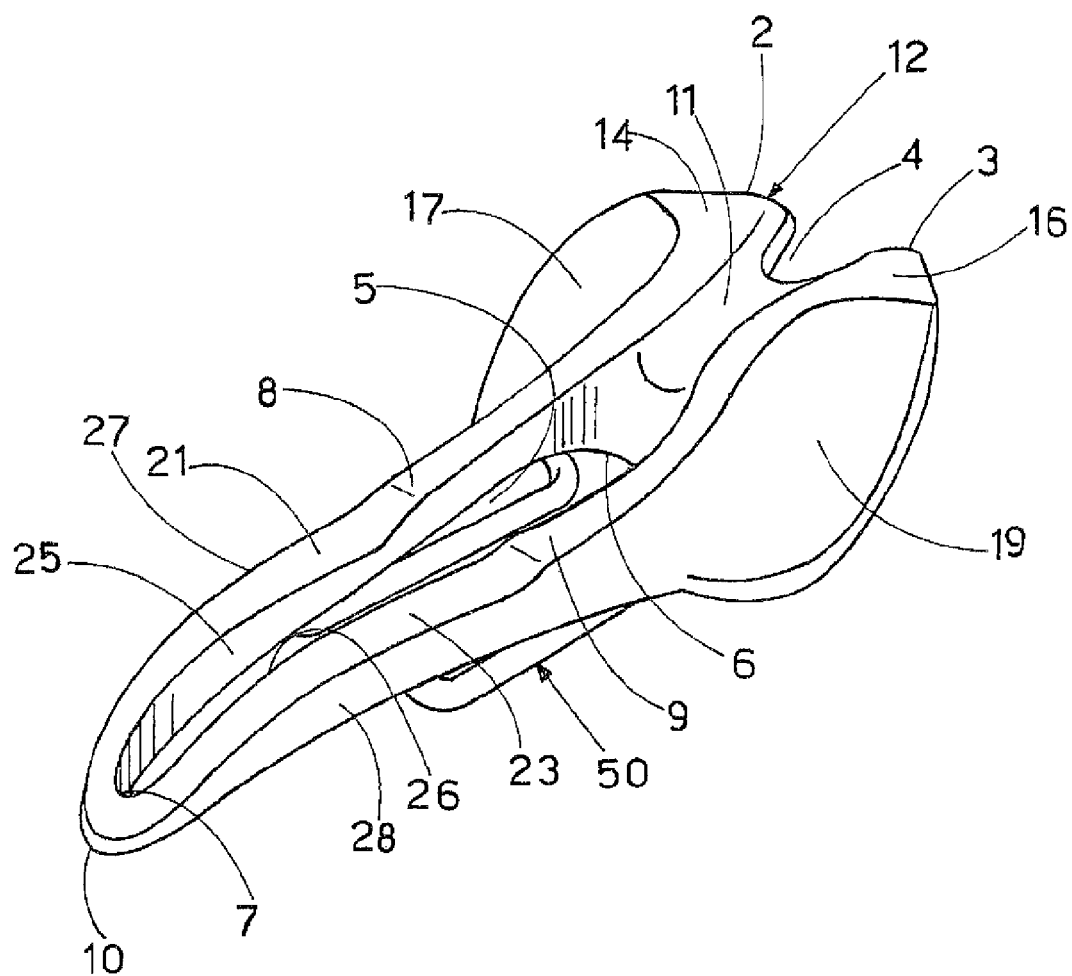
FIG. 2 is a perspective view of the support shell or body, before placement of the padding thereon, of the saddle according to the invention.
Figure 3:
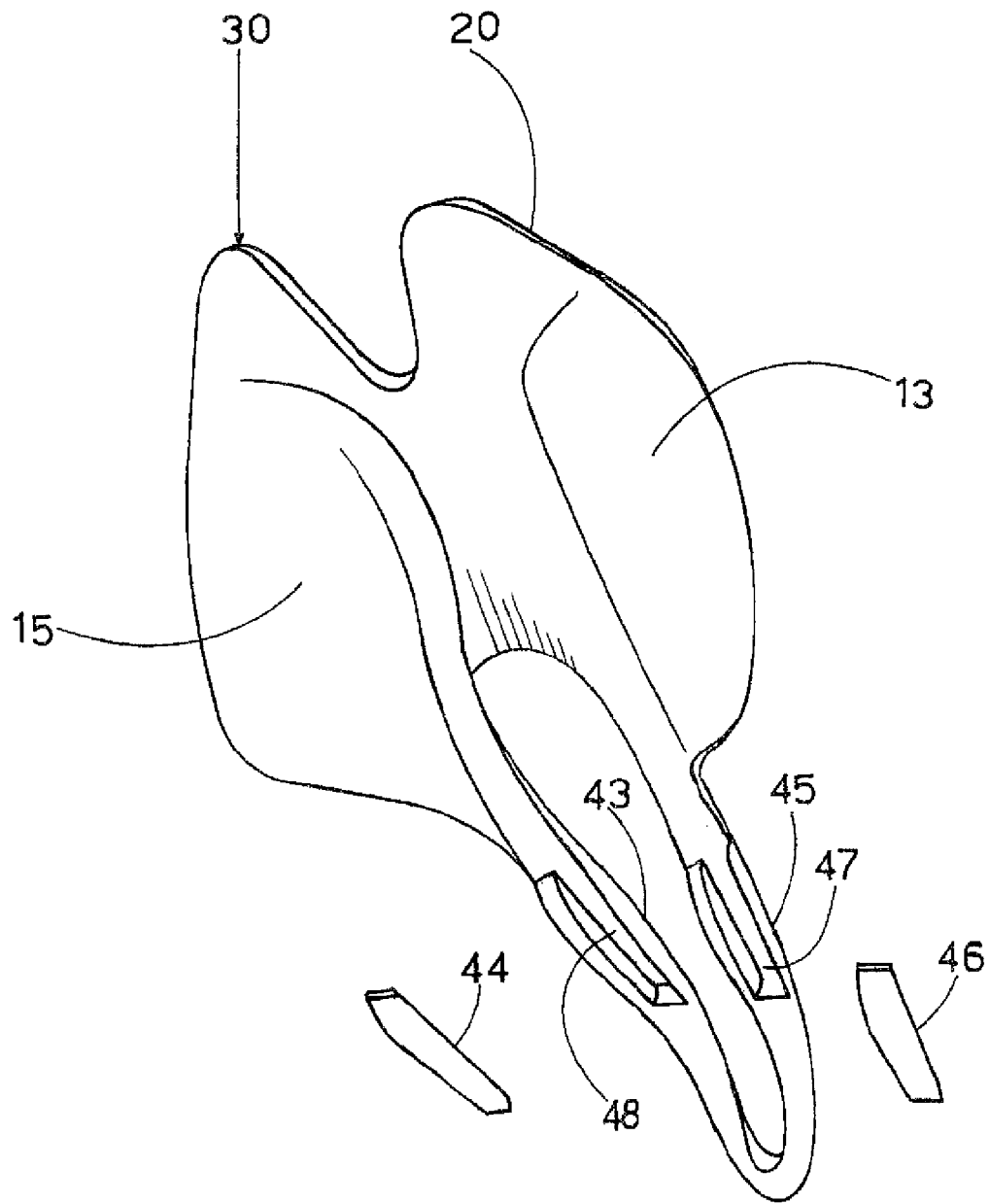
FIG. 3 is a perspective view of the padding of the saddle according to the invention, which is glued on the body of the aforementioned saddle.

FIG. 1 shows that the saddle 1 according to the invention has two identical portions 2, 3, arranged symmetrically with respect to the longitudinal axis of the saddle which are separated, at the rear part thereof, by a substantially dove-tail-shaped inlet 4 and thus mutually connected by a depression 11, after which a channel-shaped hole 5 open from top to bottom is provided, with the inlet 4, the depression 11 and the channel 5 arranged at the median longitudinal axis of the saddle. Also in the saddle according to the invention, just like in the previously described saddle, the channel gradually narrows width-wise, going from rear part thereof to the front part thereof; furthermore, the channel is delimited by two portions 8, 9, which are mutually connected and are inclined so as to form an aquiline shape at the front end 10 of the saddle. According to the invention, it is provided that the areas 14, 16 of the saddle intended to support the gluteal muscles of the cyclist and arranged at the rear part have a convexity facing upwards and they are inclined with respect to the horizontal, in the conditions of normal use of the saddle, by about 5°-10°. Such areas 14, 16 proceed with two further areas 13, 15 which have a considerable padding, with a thickness of about 10-15 mm, which has an upward convexity. FIG. 9 shows that these areas have an inclination with respect to the horizontal by about 30°-45° for resting the internal part of the ischial tuberosities. Such areas 13, 15 are then each connected with one of the narrow portions 8, 9 which delimit the channel 5. Such portions 8, 9 proceed with further areas 43, 45 which, as observable in particular in FIG. 7, are upwardly inclined by about 5°-10°. Such areas 43, 45 are thus joined at the semicircular-shaped end 10, determining the aquiline shaped structure, which delimits the saddle at the front part. Such structure is downwardly inclined by about 30°-60°. Still according to the invention, the padding 30 of the saddle is made of plastic material, in particular, soft foamed elastomeric polyurethane. Such padding covers the entire body 12 of the aforementioned with a thickness 20, which—at the areas 14, 16 intended to support the gluteal muscles of the cyclist—is about 3-5 mm, while at the areas 13, 15, it has a thickness of about 10-15 mm. As observable in FIG. 2, which, it should be borne in mind, illustrates the body of the saddle, the concave-shaped areas 17, 19 are illustrated, which are arranged underlying the areas 13, 15 and have a depth of 10 mm at the central part thereof. Such areas 17, 19 are inclined by about 30°-45° with respect to the horizontal direction. Vice versa at the portions 8, 9, the thickness 20 of the padding returns to be about 3.5 mm, while the areas 21, 23 of the body 12 underlying saddle areas 43, 45 are 5-7 mm lower with respect to the portions 8, 9, thus the thickness of the padding is equivalent to about 10-12 mm. Observing FIGS. 2 and 3 it will be seen that at the areas 21, 23, in the lower part of the padding 30, cavities 47, 48 are also provided, in which cushions 44, 46 are inserted, advantageously made of soft compact polyurethane with 16-25 Shore hardness. Such cushions are intended to be placed, at the lower face of padding 30 precisely above the areas 21, 23 and the presence thereof prevents the pubic arch of the cyclist from touching the rigid surface of the body 12 made of rigid plastic material (advantageously made of Nylon® and carbon fiber).

It is also provided that the parts of the body 12 corresponding to the portions 8, 9, as well as the areas 21, 23, which are arranged adjacent to the central channel, descend perpendicularly in the outer part thereof, while they descend internally with an inclination equivalent to about 78° having an inverted U-shape. As observable in FIGS. 10 and 11, at the lower surface of the saddle (in practice of the body thereof), a support fork 50 is provided, which has a pair of substantially parallel longitudinal members 51, 52. Each one of them is arranged beneath the front portions of the saddle which are arranged adjacent to the central channel 5 and the ends thereof 53, 54, —S-shaped— can be inserted into cylindrical seats 35, 36, arranged beneath the body of the saddle, in proximity of the aquiline-shaped area. Vice versa transversal portions 55, 56, arranged at the rear part with respect to the longitudinal members 51, 52, are intended to be inserted in impressions 40 obtained in parallelepiped-shaped structures 37, 38 with height equivalent to the diameter of the support fork. Such structures are obtained at the lower surface of the rear part of the saddle; they have at the front part a flat upper surface 31, 33 each having two holes, for the insertion of fastening screws. Furthermore, at the part opposite to that in which the holes are present, they have two edges inclined by 45° joined by projections 39 and underlying recesses. Furthermore, closing covers 42 are provided, with a parallelepiped shape identical to the upper surface of the structures 37, 38, each of which have—in the front part—two holes for inserting concealable elements, while at the rear part, in the underlying part, they have a projection 41 and a recession identical and contrary to those of the structures 37,38. Projection 41 of each cover 42 being adapted to be received in the recess underlying projection 39 of the respective structure 37, 38. In particular, it is provided fey that, after inserting the ends 53, 54 of the tubular elements into the seats 35, 36, as well as after resting the portion 55, 56 of the fork on the impressions 40, the covers 42 (FIG. 11) be rested on the upper surface of the body, thus slipping the structures 37, 38 thereon sandwich-like, so that the identical and contrary shapes of the projections and recesses match perfectly with respect to each other; lastly, it is provided that the definite fixing be completed by inserting into the holes provided with two pairs of screws, which, with fastening, maintained, holds the support fork firmly on the impressions 40 previously made on the body.

Lastly, it may be provided for that the two covers 42 be mutually connected by a transverse structure 57, on which signs, drawings and the like may be impressed, in particular of the manufacturer and the seller of the saddle.

The invention claimed is:

1. A bicycle saddle (1) including a hard shell or body (12) covered by a padding (30) formed of a soft foamed elastomer polyurethane plastic having a thickness (20), said saddle having two longitudinally symmetrical identical portions (2, 3) separated from one another at a rear part by a substantially dovetail shaped inlet (4) and being centrally connected together by a depression (11) extending from said dovetail shaped inlet (4) to an open channel (5), said dovetail shaped inlet (4), depression (11), and open channel (5) being arranged at a central longitudinal axis of said saddle, said open channel (5) gradually narrowing in width from a rear part thereof at said depression (11) to a front part thereof and being delimited by two forwardly extending extensions (8, 9) disposed on either side of said open channel (5), wherein said bicycle saddle (1) further includes:
   a) first areas (14, 16) respectively arranged on said identical portions (2, 3) at a rear of said saddle adapted to support the gluteal muscles of a cyclist when mounted on said saddle, said first areas (14, 16) being upwardly convex in longitudinal and transverse section and inclined downwardly from the horizontal in the longitudinal direction towards a front end (10) of said saddle by about 5° to 10° the thickness (20) of said padding (30) in said first areas being about 3 to 5 mm;
   b) second areas (13, 15) respectively following on from said first areas (14, 16) in the longitudinal direction towards the front end (10) of said saddle each respectively joining with one of said two forwardly extending extensions (8, 9), said second areas (13, 15) being inclined on lateral sides of said saddle by about 30° to 45° from the horizontal and being upwardly convex so as to support the inner part of the ischial tuberosities of a cyclist when mounted on said saddle, areas (17, 19) of said shell (12) underlying said second areas (13, 15) of said saddle substantially follow the lateral inclination of said second areas (13, 15) and have a concave shape with a depth of about 10 mm in a central area thereof, the thickness (20) of said padding (30) in said second areas being about 10 to 15 mm;
   c) third areas (43, 45) respectively arranged on said forwardly extending extensions (8, 9) and being inclined upwardly from the horizontal in the longitudinal direction towards the front end (10) of said saddle by about 5° to 10° and joined together at the front end (10) of said saddle forming a semi-circle, at said front end (10) of said saddle said third areas are inclined downwardly 30° to 60° from the horizontal to form an aquiline shape, underlying said third areas (43, 45) where the pubic arch of a cyclist when mounted on said saddle is supported are respective areas (21, 23) of said body (12) which are depressed 5 to 7 mm relative to corresponding surfaces of said forwardly extending extensions (8, 9) of said saddle, on a lower surface of said padding (30) corresponding to said areas (21, 23) of said body (12) underlying said third areas (43, 45) of said saddle respective cavities (47, 48) are formed and filled with compact polyurethane cushions (44, 46) having a Shore hardness of 16 to 25, said padding (30) has a thickness (20) at said forwardly extending extensions (8, 9) following on from said second areas (13, 15) of about 3 to 5 mm and at said third areas (43, 45) of about 10 to 12 mm, whereby, when a cyclist is mounted on said saddle the cyclist's pubic arch is thereby prevented from touching the hard shell or body (12) at said areas (21, 23) underlying said third areas (43, 45) of said saddle.

2. The bicycle saddle (1) according to claim 1, wherein the areas (21, 23) of said hard shell or body (12) underlying said third areas (43, 45) of said saddle adjacent said open channel (5) have an inverted U-shape with a perpendicular inclination on the lateral side of said saddle and an inclination of 78° at an inside of said open channel (5).

3. The bicycle saddle (1) according to claim 1, which further includes a support fork (50) arranged at a bottom surface of said saddle (1) having a pair of substantially parallel longitudinal members (51, 52) each disposed beneath said forwardly extending extensions (8, 9), respectively, flanking said open channel (5), said longitudinal members (51, 52) each having an S-shaped end (53, 54) adapted for insertion into respective cylindrical seats (35, 36) arranged on the bottom surface of said saddle adjacent the front end (10) thereof, said support fork (50) further including transversal sections (55, 56) extending from a rear of said respective longitudinal members (51, 52) and adapted for insertion into respective impressions (40) formed in parallelepiped-shaped structures (37, 38) having a height equal to a diameter of said support fork (50) and formed on the bottom surface of said saddle at a rear part thereof, said parallelepiped-structures (37,38) including respective flat surfaces (31,33) each with two screw holes to the front of said impressions (40) and on the opposing side are two edges inclined by 45°, joined by projections (39) and underlying recesses, wherein closing covers (42) have the same shape as the upper surface of the parallelepiped-structures (37, 38), with two holes each in the front part, for acceptance of flat-head screws, and projections (41) and recesses at the back in the underlying part complementary to the projections (39) and underlying recesses of the parallelpiped structures (37, 38), whereby after having inserted the ends (53, 54) inside the seats (35,36) and rested the transversal sections (55, 56) of the fork on the impressions (40), the covers (42) are rested on a rear surface of the shell, and then they are slid over the parallelepiped-structures (37, 38) sandwich-like, and the two pairs of screws are inserted into the holes provided, said screws keeping the support fork firmly secured on the impressions (40) of the parallelpiped-shaped structures (37, 38).

4. The bicycle saddle (1) according to claim 3, which further includes a transversal structure (57) interconnecting said closing covers (42).

\* \* \* \* \*